Patented June 19, 1934

1,963,761

UNITED STATES PATENT OFFICE 1,963,761

PROCESS OF MAKING CHLOROBENZENE

Walter Prahl, Ludwigshafen - on - the - Rhine, Bavaria, Germany, assignor to F. Raschig G. m. b. H., Ludwigshafen, Germany, a firm of Germany No Drawing. Application March 10, 1931, Serial No. 521,510. In Germany April 12, 1930

14 Claims. (Cl. 260—161)

The Deacon process for making chlorine consists in passing a mixture of hydrogen chloride and oxygen or air over a porous body, such as burnt clay, pumice or the like, saturated with a copper salt and heated to a temperature of about 350–500° C. The hydrogen chloride is in part converted into elementary chlorine. When elementary chlorine is used for chlorinating organic compounds a considerable part of it (in the commonest case, namely substitution, one half of it) is converted into hydrogen chloride. Since in the Deacon process hydrogen chloride is converted into chlorine, and in organic substitution chlorine is converted into hydrogen chloride, it would appear reasonable to combine these processes. It would only be necessary to introduce the organic substance to be chlorinated into the current of gas, in order to use the hydrogen chloride as the agent for chlorinating the organic substance.

This procedure has been described in different forms as applicable to the chlorination of benzene and hydrocarbons of the aliphatic series. A common feature of all these processes consists in mixing the hydrocarbon to be chlorinated with hydrogen chloride or vapors of aqueous hydrochloric acid and air, and in some cases a diluent, and subjecting the mixture to the temperature and contact substance used in the Deacon process. Now the temperatures at which the Deacon process yields chlorine are quite high and therein lies an essential disadvantage of the processes in question. On the one hand they involve the combustion of a not inconsiderable portion of the hydrocarbon being chlorinated; on the other hand, the high temperature produces an unfavorable course of reaction, especially in the chlorination of benzene. At the high temperature and in the presence of water, which is already present or is produced by the combustion a portion of the chlorobenzene formed suffers a hydrolysis to phenol which not only is more easily further chlorinated than benzene is but also is easily destroyed by complete decomposition, condensation and other changes incidental to the process.

It is to be supposed that it would be possible to avoid the unfavorable consequences of the high temperature, particularly the combustion and the hydrolysis if it were possible to operate at a lower temperature. It appears, however, from the present position of the art that there is no prospect of such a reduced temperature being available, for in the presence of the contact masses used in the Deacon process a reasonably considerable formation of chlorobenzene does not occur until a temperature far above 300° C. has been attained.

According to the invention a considerably lower temperature—indeed one far below that hitherto considered possible—may be used in the conversion of a mixture of benzene, hydrogen chloride or hydrochloric acid and air into chlorobenzene, by using as contact substance one containing besides copper one or more metals of groups 3 to 8 of the periodic system or compounds thereof. Whereas a contact substance containing only copper, such as the clay mass saturated with copper chloride used in the Deacon process, requires a temperature above 400° C. for the production of an industrial yield of chlorobenzene, like contact masses, containing in addition to the copper one or more metals of groups 3 to 8 of the periodic system, determine the formation of a considerable proportion of chlorobenzene, even at a temperature of about 150° to 170° C. Particularly advantageous additions to the copper are cobalt, nickel, manganese, iron and chromium. However, a useful effect may be attained by the use of any other metal of groups 3–8 of the periodic system.

One procedure for making chlorobenzene in accordance with the invention consists in passing a current of vaporized benzene, hydrogen chloride and oxygen, with or without a diluent, such as nitrogen or steam, at a temperature, having its lower limit not substantially below 150° C. preferably not exceeding 300° C. over a contact substance, which, in addition to copper, contains one or more said metals or their compounds, the preferred contact being a carrier having a large surface area, such as clay, aluminum hydroxide, pumice or silica gel, on which the said metals or their compounds have been precipitated. Under the conditions named a portion or the whole of the chlorine contained in the hydrogen chloride is transferred to the benzene and chlorobenzene is almost exclusively formed; it can be isolated in known manner, for instance by fractional condensation, distillation, absorption or otherwise, from the mixture of products. The benzene which has not entered into reaction can be returned to the process.

The advantages of the process described, as compared with those hitherto known for making chlorobenzene by this reaction, will be obvious from the facts stated. According to the new process the vapors are heated only to a temperature considerably lower than that hitherto used, so that less heat is consumed. The corrosion of the apparatus by the hydrogen chloride by external influences and by the action of heat, is diminished in consequence of the lower temperature. Combustion of the benzene practically does not occur. In consequence there is a higher yield. The formation of high chlorinated products is considerably diminished. Hydrolysis of the chlorobenzene with all its consequences is not noticeable. Substantially the only products present in the condensate, which is as clear as water, are chlorobenzene and some dichlorobenzene, whereas in the dark brown condensate obtained in the old processes a whole series of by-products, such as phenol, mono-, di- and tri-chlorophenol, diphenyl and hydroxydiphenyl, in addition to others, are to be found. A further advantage resides in the fact that an excess of air, which in the known processes led to a considerable combustion of the organic substances, is, in the present process, not only not injurious but favorable, since it renders possible the complete converion of the hydrogen chloride into chlorobenzene, which in the earlier processes cannot be attained with use of the theoretical proportion or an even smaller proportion of air.

The advantages to be attained by the use of the low temperatures available by this invention, in particular the quite considerable increase of the speed of the reaction between the components and the elimination of the danger of combustion of the chlorobenzene, also in part remain when one works at the temperatures previously used.

The following examples illustrate the invention:—

Example 1.—600 grams of silica gel are impregnated with a solution of 150 grams of crystallized copper chloride and 30 grams of crystallized cobalt chloride in 170 cc. of water. Over this contact, heated to 180° C. are conducted per hour 70 litres of air, charged with 25 grams of hydrogen chloride and 200 grams of vaporized benzene. The issuing vapors are condensed. The condensate forms two layers, one of which is water almost free from hydrochloric acid and the other is substantially a solution of chlorobenzene in benzene. By distillation of the latter 71 grams of chlorobenzene and 4 grams of dichlorobenzene are obtained. The benzene, separated by distillation, can be returned to the process.

Example 2.—350 grams of kieselguhr are impregnated with a solution of 100 grams of crystallized copper chloride and 30 grams of crystallized nickel chloride in 400 cc. of water, and then dried. At 190° C. there are passed over this contact per hour 25 litres of air, carrying 10 grams of hydrogen chloride and 100 grams of vaporized benzene. As described in the previous example, there may be separated from the products 28 grams of chlorobenzene and 1 gram of dichlorobenzene.

Example 3.—350 grams of active carbon are impregnated with a solution of 100 grams of crystallized copper chloride and 20 grams of manganese chloride in 150 cc. of water. At 200° C. there are passed over this contact per hour 15 litres of air carrying 10 grams of hydrogen chloride and 45 grams of vaporized benzene. From the condensate there are isolated 27 grams of chlorobenzene and 2 grams of dichlorobenzene.

Example 4.—600 grams of aluminum hydroxide are impregnated with a solution of 100 grams of copper chloride and 5 grams of cerium chloride in 150 cc. of water. At 200° C. there are conducted over this contact per hour a gaseous mixture of 30 litres of air, 150 grams of vaporized benzene and 75 grams of vaporized aqueous hydrochloric acid of 17 per cent. strength. From the condensate there may be isolated 30 grams of chlorobenzene and 5 grams of dichlorobenzene.

Example 5.—3000 cc. of concentrated solution of sodium aluminate are diluted to about 20 times their volume and slowly mixed with a diluted solution of 200 grams of copper chloride, 30 grams of iron chloride and so much hydrochloric acid that all aluminum hydroxide will be precipitated. The contact is then put under suction, washed with water and dried. Over 500 grams (1000 cc.) of said contact, heated to 200° C. are conducted per hour the vapor formed by 200 grams of benzene, 50 litres of air and about 100 cc. of 17% hydrochloric acid. 40 grams of chlorobenzene per hour are thus separated by distillation.

Example 6.—900 cc. (500 grams) of Florida earth are impregnated with a solution of 180 grams of copper chloride, 45 grams of iron chloride in 450 grams of water. Over this contact is passed at 200° C. a mixture of 75 litres of air, 15 litres of hydrochloric acid gas, 90 litres of vapor of benzene and thus 30 grams of chlorobenzene are obtained per hour.

It is to be understood that the references in the specification and claims to copper and to metals of groups 3 to 8 of the periodic system are intended to include compounds of copper and the said metals.

What I claim is:—

1. A process for making chlorobenzene which comprises passing a mixture of benzene vapor, hydrogen chloride and oxygen at a temperature having its lower limit not substantially below 150° and ranging upward to a point below 300° C. over a catalyst containing both a copper compound and at least one catalytically active compound of a metal of groups 3 to 8 of the periodic system.

2. A process for making chlorobenzene which comprises passing a mixture of benzene vapor, hydrogen chloride, oxygen and at least one diluent which is inert under the conditions of the process at a temperature having its lower limit not substantially below 150° and ranging upward to a point below 300° C. over a catalyst containing both a copper compound and at least one catalytically active compound of a metal of groups 3 to 8 of the periodic system.

3. A process for making chlorobenzene which comprises passing a mixture of benzene vapor, hydrogen chloride and air at a temperature having its lower limit not substantially below 150° and ranging upward to a point below 300° C. over a catalyst containing both a copper compound and at least one catalytically active compound of a metal of groups 3 to 8 of the periodic system.

4. A process for making chlorobenzene which comprises passing a mixture of benzene vapor, hydrogen chloride, water vapor and oxygen at a temperature having its lower limit not substantially below 150° and ranging upward to a point below 300° C. over a catalyst containing both a copper compound and at least one catalytically active compound of a metal of groups 3 to 8 of the periodic system.

5. A process for making chlorobenzene which comprises passing a mixture of benzene vapor, hydrogen chloride, water vapor and air at a temperature having its lower limit not substantially below 150° and ranging upward to a point below 300° C. over a catalyst containing both a copper compound and at least one catalytically active compound of a metal of groups 3 to 8 of the periodic system.

6. A process for making chlorobenzene which comprises passing a mixture of benzene vapor, hydrogen chloride, water vapor and oxygen at a temperature having its lower limit not substantially below 150° and ranging upward to a point below 300° C. over a catalyst containing both a copper compound and at least one catalytically active compound of a metal of groups 3 to 8 of the periodic system, said catalyst being carried by a substance having a large surface area.

7. A process for making chlorobenzene which comprises passing a mixture of benzene vapor, hydrogen chloride, oxygen and at least one diluent which is inert under the conditions of the process at a temperature having its lower limit not substantially below 150° and ranging upward to a point below 300° C. over a catalyst containing both a copper compound and at least one catalytically active compound of a metal of groups 3 to 8 of the periodic system, said catalyst being carried by a substance having a large surface area.

8. A process for making chlorobenzene which comprises passing a mixture of benzene vapor, hydrogen chloride and air at a temperature having its lower limit not substantially below 150° and ranging upward to a point below 300° C. over a catalyst containing both a copper compound and at least one catalytically active compound of a metal of groups 3 to 8 of the periodic system, said catalyst being carried by a substance having a large surface area.

9. A process for making chlorobenzene which comprises passing a mixture of benzene vapor, hydrogen chloride, water vapor and oxygen at a temperature having its lower limit not substantially below 150° and ranging upward to a point below 300° C. over a catalyst containing both a copper compound and at least one catalytically active compound of a metal of groups 3 to 8 of the periodic system, said catalyst being carried by a substance having a large surface area.

10. A process for making chlorobenzene which comprises passing a mixture of benzene vapor, hydrogen chloride, water vapor and air at a temperature having its lower limit not substantially below 150° and ranging upward to a point below 300° C. over a catalyst containing both a copper compound and at least one catalytically active compound of a metal of groups 3 to 8 of the periodic system, said catalyst being carried by a substance having a large surface area.

11. A process of making chlorobenzene which comprises passing a mixture of benzene vapor, hydrogen chloride and oxygen at a temperature having its lower limit not substantially below 150° and ranging upward to a point below 300° C. over a catalyst containing copper and iron.

12. A process of making chlorobenzene which comprises passing a mixture of benzene vapor, hydrogen chloride and air at a temperature having its lower limit not substantially below 150° and ranging upward to a point below 300° C. over a catalyst containing copper and iron.

13. A process of making chlorobenzene which comprises passing a mixture of benzene vapor, hydrogen chloride and air at a temperature having its lower limit not substantially below 150° and ranging upward to a point below 300° C. over a catalyst containing copper and iron, said catalyst being carried by Florida earth.

14. A process of making chlorobenzene which comprises passing a mixture of benzene vapor, vaporized aqueous hydrochloric acid and air at a temperature having its lower limit not substantially below 150° and ranging upward to a point below 300° C. over a catalyst containing copper and iron, said catalyst being carried by aluminium hydroxide.

WALTER PRAHL.